United States Patent [19]
Genho

[11] 3,897,637
[45] Aug. 5, 1975

[54] LASER LEVEL AND SQUARE

[76] Inventor: Robert Genho, P.O. Box 3308, Granada Hills, Calif. 91344

[22] Filed: Mar. 18, 1974

[21] Appl. No.: 451,733

[52] U.S. Cl. ............... 33/227; 33/290; 33/DIG. 21; 356/138
[51] Int. Cl. .................. G02b 7/14; G01b 11/26
[58] Field of Search ...... 33/227, 290, 291, DIG. 21; 356/138, 146

[56] References Cited
UNITED STATES PATENTS

| | | |
|---|---|---|
| 2,346,006 | 4/1944 | Burt ...................................... 33/290 |
| 3,300,861 | 1/1967 | Lilly ...................................... 33/289 |
| 3,446,560 | 5/1969 | Brasier ............................... 356/146 |
| 3,528,748 | 9/1970 | Burch et al. .................... 33/DIG. 21 |
| 3,588,249 | 6/1971 | Studebaker .......................... 33/290 |
| 3,813,170 | 5/1974 | Sears .................................. 356/138 |
| 3,817,624 | 6/1974 | Martin ................................ 356/138 |

*Primary Examiner*—William D. Martin, Jr.
*Attorney, Agent, or Firm*—Harris, Kern, Wallen & Tinsley

[57] ABSTRACT

A building level having a laser providing two and three beams simultaneously at 90° to each other, and means for leveling and aligning the unit, and means for rotating the unit 90° to provide grade and vertical.

11 Claims, 7 Drawing Figures

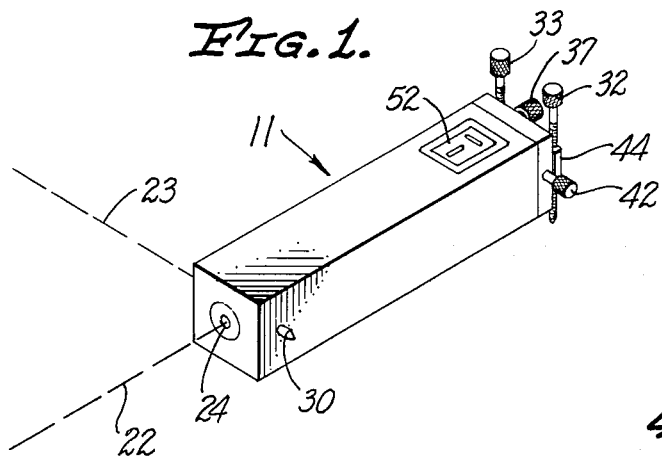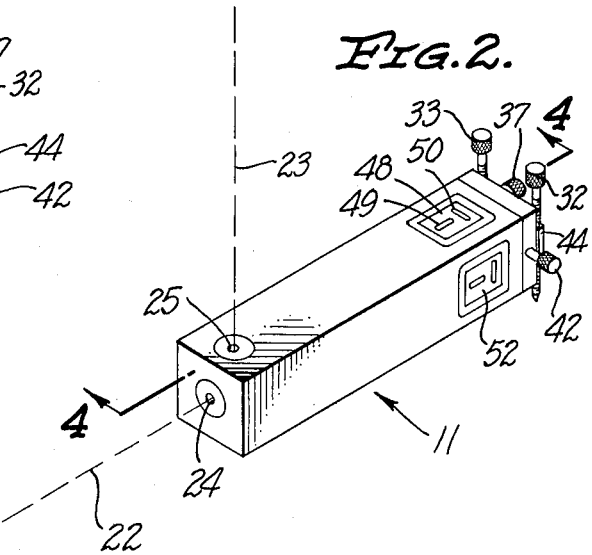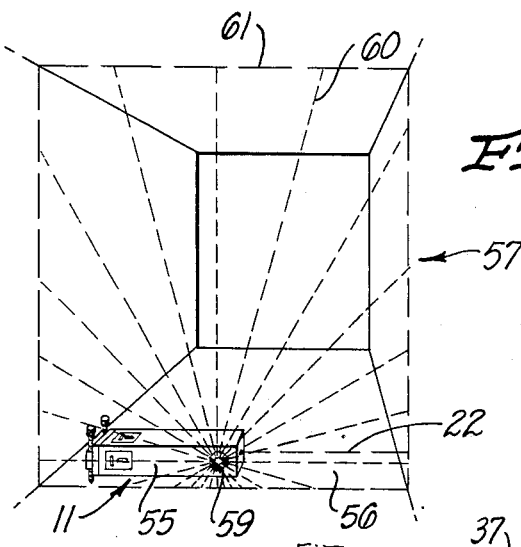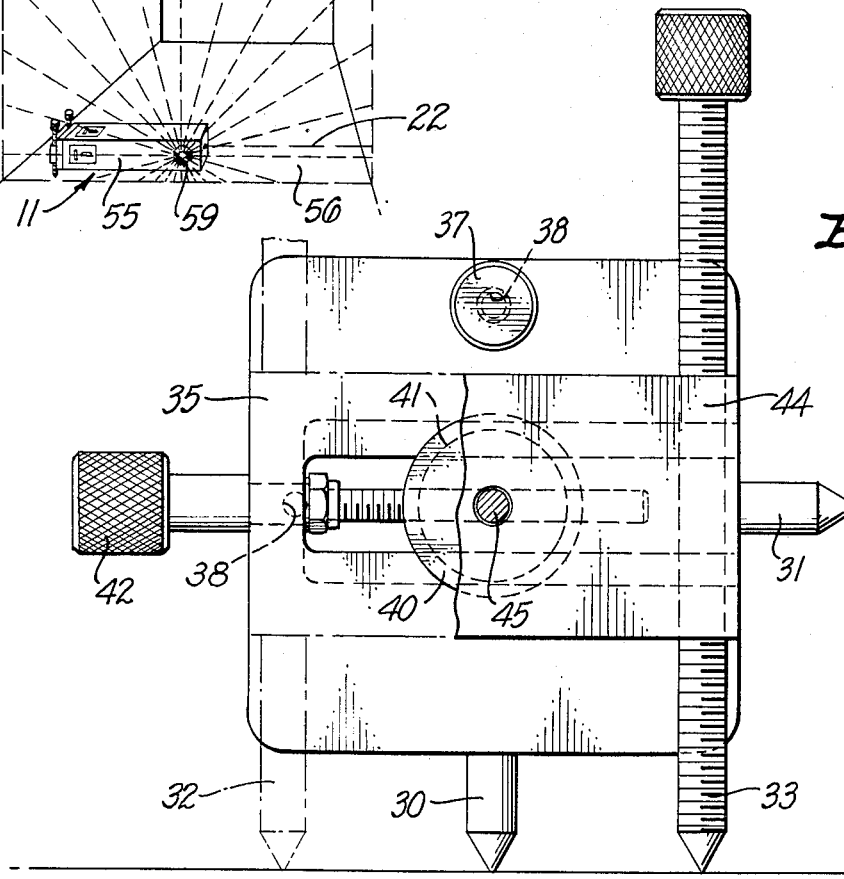

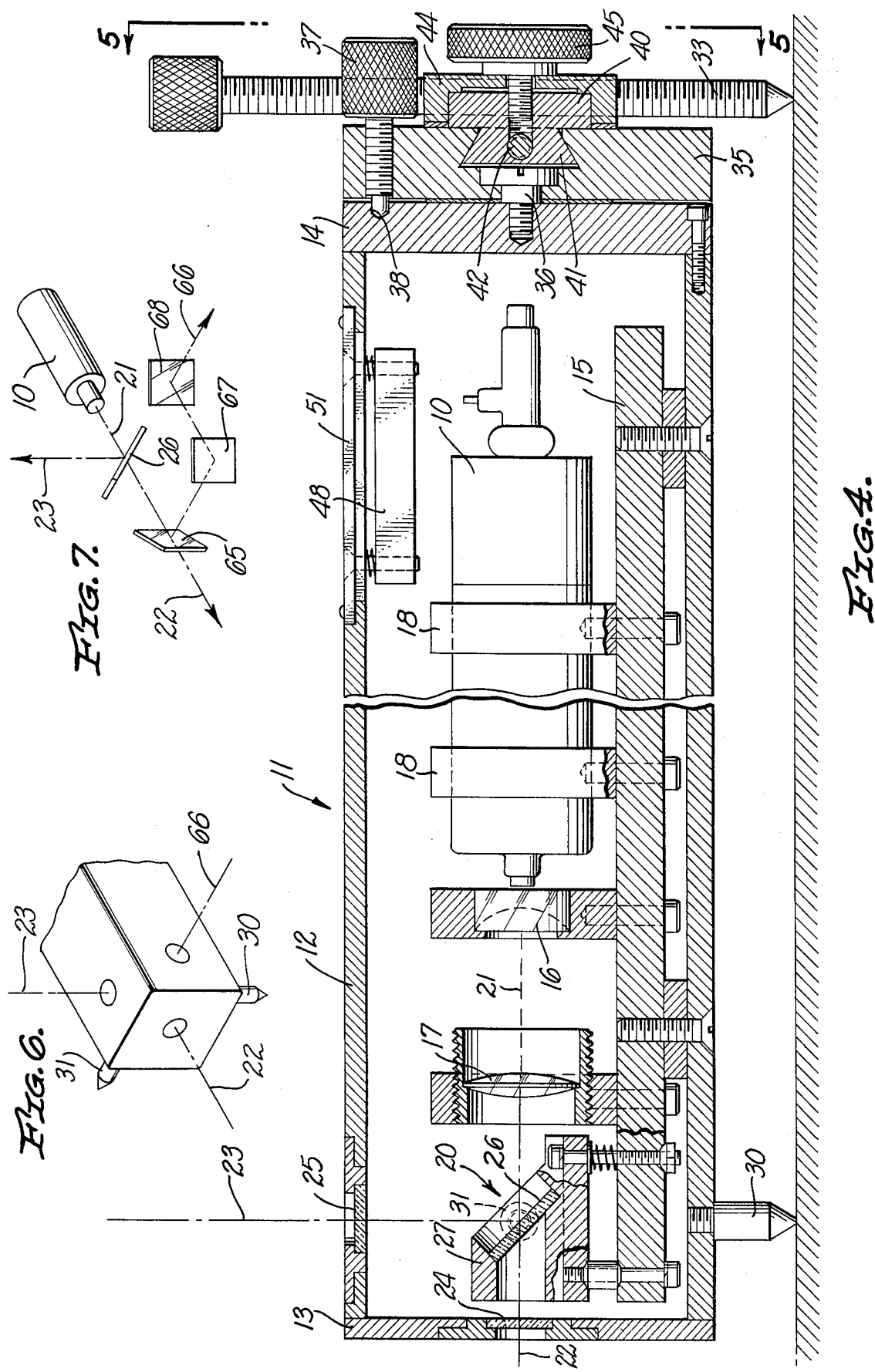

LASER LEVEL AND SQUARE

This invention relates to building levels and in particular to a new and improved level incorporating a laser providing light beams for use in leveling, squaring and other alignment functions in the building and construction industry.

One prior art level on the market incorporates a laser with a prism at the output with the prism being adjustable to direct the output beam in various directions. Another unit on the market incorporates a laser providing a single beam output and includes a variety of attachments for mounting the laser in various configurations. These prior art devices suffer from a number of disadvantages. For example they can be used for leveling in only one axis at a time. They cannot provide grade or level indication along two lines at 90° simultaneously. They cannot be used to provide grade and a vertical at the same time.

The present invention provides a building level with laser output beams and in particular, two simultaneous output beams at 90° which can be used for leveling or grade along two axes at the same time, and for a level and a vertical at the same time. The building level of the invention permits one man to square a building, i.e., lay out the four corners of a rectangular plan. The building level is also adapted for use with a beacon to provide a plane of light simultaneously with a grade beam. In an alternative embodiment, three output beams at 90° are provided simultaneously.

Other advantages, features and results will more fully appear in the course of the following description. The drawings merely show and the description merely describes a preferred embodiment of the present invention which is given by way of illustration or example.

In the drawings:

FIG. 1 is a perspective view of a building level incorporating the presently preferred embodiment of the invention and illustrating its use in obtaining a grade along two axes;

FIG. 2 is a view similar to that of FIG. 1 showing the laser rotated 90° to provide grade and vertical at the same time;

FIG. 3 is a view of the instrument of FIGS. 1 and 2 with a beacon attachment providing a light plane parallel to a level beam;

FIG. 4 is an enlarged vertical sectional view taken along the line 4—4 of FIG. 2;

FIG. 5 is a view taken along the line 5—5 of FIG. 4;

FIG. 6 is a view similar to that of FIG. 2 showing an alternative embodiment with three simultaneous output beams; and FIG. 7 is a diagrammatic view of the interior of the instrument of FIG. 6.

Referring to FIGS. 4 and 5, a laser 10 is mounted in a housing 11 which may comprise a tubular body with end plates 13, 14. The laser 10 may be a standard unit and the internal mounting components will depend upon the configuration of the laser. In the embodiment illustrated in FIG. 4, the laser 10 is carried in brackets 18 which in turn are mounted on a plate 15 supported from an inner wall of the housing. A lens 16 and another lens 17 are carried in suitable amounts on the plate 15 for directing the laser beam to a beam splitter 20.

The beam splitter 20 may be a conventional unit which transmits a portion of the laser beam 21 providing a first output beam 22, and reflects a portion of the beam 21 to provide a second output beam 23. The beams 22, 23 leave the housing through suitable windows 24, 25, respectively. The beam splitter 20 typically is a half mirror 26 carried in an adjustable mount 27 which is adjusted at the factory to provide a predetermined angle between the beams 22, 23, usually 90°.

Fixed support points 30, 31 are carried adjacent one end of the housing and adjustable support points 32, 33 are carried adjacent the other end of the housing. A block 35 is rotatably mounted on the end plate 14 by a screw 36. An index screw 37 is carried in the block 35 for engaging index openings 38 in the plate 14. In the preferred embodiment, there are two index openings 38 positioned at an angular relation of 90°.

Another block 40 has a wedge shaped portion 41 which translates in a corresponding wedge shaped opening in the block 35. The block 40 is driven by a screw 42 journaled in the block 35 and threadedly engaging the block 40.

Another block 44 is carried on the block 40 and is clamped in place by a screw 45. The points 32, 33 are screws threadedly mounted in the block 44.

A level unit 48 comprising first and second bubble levels 49, 50 is mounted in the side of the housing opposite the point 30 behind a cover glass 51. A similar level unit 52 is mounted in the side of the housing opposite the point 31. At the time of manufacture, the laser 10, the beam splitter 20, and the level units 48, 52 are adjusted in the housing so that when the unit is in the position of FIG. 1 and both elements of the level unit 52 indicate level, the beams 22 and 23 are horizontal with an angle of 90° therebetween, and when the unit is in the position of FIG. 2 with the level unit 48 indicating level, the beam 22 is horizontal and the beam 23 is vertical. The device is now ready for use.

One example of use of the building level in obtaining grade or level along two paths at 90° is illustrated in FIG. 1. The instrument is place in the position indicated in FIG. 1, with the point 31 at the corner previously determined. The instrument is leveled by independently adjusting the screws 32, 33 to the level condition as indicated by the level unit 52. The beam 22 is then aligned along the desired path by adjusting the screw 42. The beam 22 now provides a level along this path and the beam 23 provides a level along a path at 90°. The desired lengths can be taped along both paths, after which the instrument is moved to one of the newly determined corners and the process repeated. Also, after the instrument has been leveled as shown in FIG. 1, a vertical or plumb line at the corner can be obtained by loosening the screw 37 and rotating the housing to the position of FIG. 2. Many other applications for the instrument will readily be apparent to those experienced in the building trade.

The instrument may also be used to give a light plane by mounting a beacon at one of the windows, the window 25 as shown in FIG. 3. A beacon is a conventional device incorporating a component for reflecting a beam at 90°, typically a mirror or pentraprism. The beacon includes a motor or other drive mechanism for rotating the reflecting device, generating a plane or sheet of light as the beacon rotates, substantially as shown in FIG. 3.

In FIG. 3, a building level 55 is mounted on the floor 56 of a room 57 in the position shown in FIG. 1 with the beam 22 providing a horizontal reference. A standard beacon 59 is mounted on the housing in place of the window 25. As the beacon rotates, the beam 60 from the beacon traces a vertical planar line 61 on the walls, floor and ceiling of the room 57 providing plumbing and lining of a wall by one man in a single operation.

A three output beam embodiment is shown in FIGS. 6 and 7, where components corresponding to those of the embodiment of FIGS. 1–5 are identified by the same reference numerals. A second beam splitter 65 is positioned in the beam 21, 22 providing an output beam 66, via mirrors 67 and 68, at 90° to the beams 22 and 23, with the three beams 22, 23 and 66 having a common point of origin at the half mirror 26.

I claim:

1. In a building level, the combination of:
   a housing;
   a laser mounted in said housing;
   first means for supporting said housing on a surface;
   second means for simultaneously directing two beams of said laser from said housing along two perpendicular axes;
   said first means including first, second and third points carried on said housing, with each of said first and second points including threaded means interconnecting the point and housing for movement of the point relative to the housing for leveling said housing;
   a first block mounted on said housing with said first and second points threadedly mounted in said first block substantially parallel to each other; and
   means for translating said first block relative to said housing.

2. A level as defined in claim 1 including third means for rotating said laser 90° about one of said axes.

3. A level as defined in claim 1 wherein said second means includes a beam splitter passing a portion of the incoming radiation from the laser and reflecting a portion at 90° to the incoming beam.

4. A level as defined in claim 1 including a second block rotatably mounted on said housing with said first block carried thereon, and means for indexing said second block relative to said housing at two positions.

5. A level as defined in claim 1 including a beacon mounted on said housing, said beacon including reflecting means for receiving one of said beams and reflecting the one beam at 90° into a plane parallel with the other of said beams, and means for rotating said reflecting means to direct said beam one around said plane.

6. A level as defined in claim 1 including third means for simultaneously directing a third beam of said laser from said housing along a third axis perpendicular to said two axes.

7. A level as defined in claim 6 with said three beams having a common point of origin.

8. A level as defined in claim 6 wherein said third means includes a second beam splitter for producing said third beam and mirror means for reflecting said third beam along the desired path.

9. In a building level, the combination of:
   a housing;
   a laser mounted in said housing;
   first means for supporting said housing on a surface;
   second means for simultaneously directing two beams of said laser from said housing along two perpendicular axes;
   said first means including first, second and third points carried on said housing, with each of said first and second points including threaded means for interconnecting the point and housing for movement of the point relative to the housing for leveling said housing;
   a fourth point carried on said housing at 90° to said third point;
   a block rotatably mounted on said housing with said first and second points threadedly mounted therein substantially parallel to each other; and
   means for indexing said block relative to said housing at two angular positions 90° apart.

10. In a building level, the combination of:
    a housing having a longitudinal axis;
    a laser mounted in said housing;
    first means for supporting said housing on a surface;
    second means for simultaneously directing two beams of said laser from said housing along said first axis and along a second axis perpendicular to said first axis;
    said first means includes first, second and third points carried on said housing, with said third point on said second axis adjacent one end of said housing, and with said first and second points adjacent the other end of said housing and moveable relative to the housing for leveling the housing.

11. A level as defined in claim 10 including a beacon mounted on said housing on said second axis, said beacon including reflecting means for receiving the second axis beam and reflecting the beam at 90° into a plane parallel with said first axis, and means for rotating said reflecting means to direct said second axis beam around said plane parallel to the first axis beam.

* * * * *